(12) United States Patent
Takahashi

(10) Patent No.: US 6,947,239 B2
(45) Date of Patent: Sep. 20, 2005

(54) MAGNETIC STORAGE DEVICE EQUIPPED WITH WRITE DRIVER CIRCUIT CAPABLE OF PERFORMING IMPEDANCE MATCHING BY A SIMPLE CIRCUIT

(75) Inventor: Yasuhiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/638,785

(22) Filed: Aug. 11, 2003

(65) Prior Publication Data

US 2004/0042110 A1 Mar. 4, 2004

(30) Foreign Application Priority Data

Aug. 28, 2002 (JP) .................................. 2002-248057

(51) Int. Cl.[7] .............................................. G11B 5/02
(52) U.S. Cl. .......................................... 360/68; 360/46
(58) Field of Search ............................. 360/65, 66, 46, 360/67, 68

(56) References Cited

U.S. PATENT DOCUMENTS 6,121,800 A * 9/2000 Leighton et al. ............ 327/110

FOREIGN PATENT DOCUMENTS

| JP | 2000-207796 | 7/2000 | ........... G11B/11/10 |
| JP | 2000207796 A | * 7/2000 | ........... G11B/11/10 |

* cited by examiner

*Primary Examiner*—David Hudspeth
*Assistant Examiner*—Daniell L. Negrón
(74) *Attorney, Agent, or Firm*—Greer, Burns & Crain, Ltd.

(57) ABSTRACT

A magnetic storage device equipped with a write driver circuit is provided. This magnetic storage device includes: four current sources each provided at a corresponding one of the four sides of an "H-bridge" circuit; a magnetic head provided at the bridging part of the "H-bridge" circuit; and a series circuit including capacitors and terminating resistors. A separate series circuit is provided between the ground and each corresponding one of the connection points of the bridging part and the four sides of the "H-bridge" circuit. With this magnetic storage device, impedance matching can be easily performed. Also, a smaller circuit size can be realized, and accordingly, the power consumption can be reduced. Furthermore, desired recording can be performed at a high transfer rate.

7 Claims, 15 Drawing Sheets

FIG.4
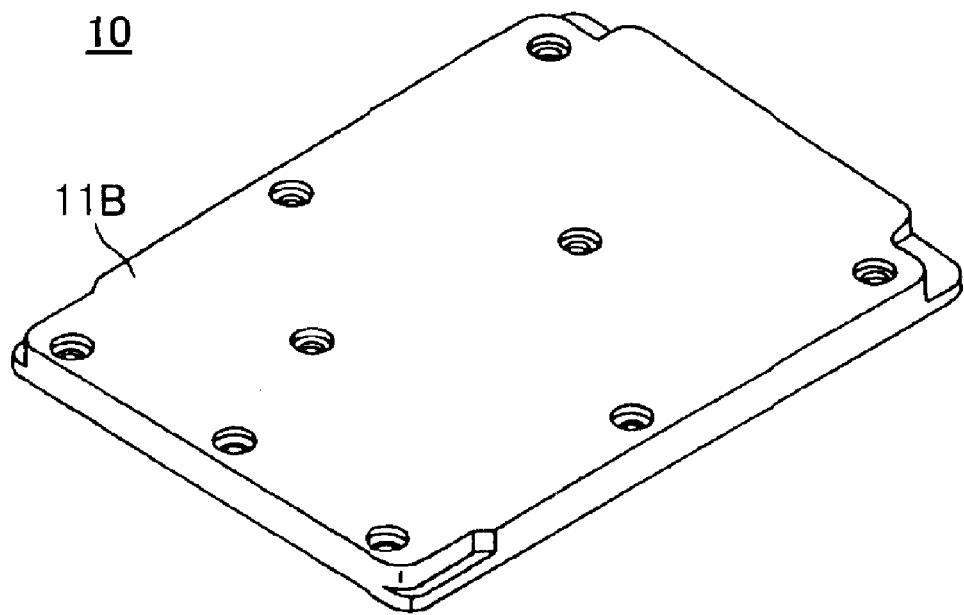
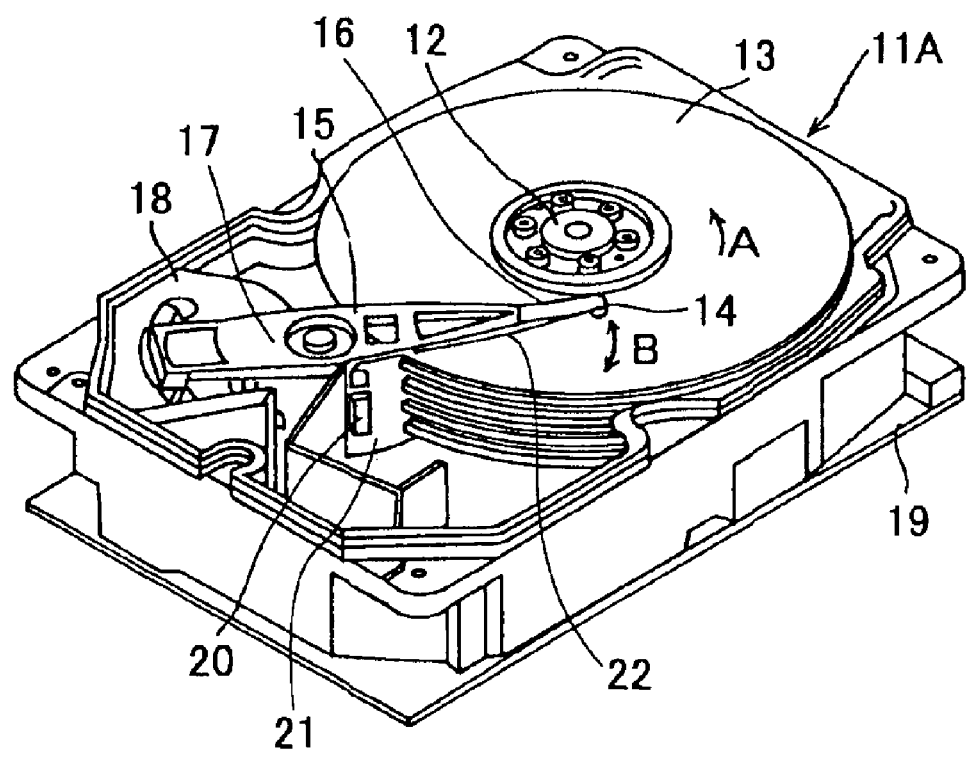

MAGNETIC STORAGE DEVICE EQUIPPED WITH WRITE DRIVER CIRCUIT CAPABLE OF PERFORMING IMPEDANCE MATCHING BY A SIMPLE CIRCUIT

BACKGROUND OF THE INVENTION

The present invention generally relates to magnetic storage devices, and, more particularly, to a magnetic storage device equipped with a write driver circuit that enables recording on a magnetic recording medium at a high transfer rate.

In recent years, there has been an increasing demand for higher transfer rates in magnetic storage devices such as hard disk devices and data back-up magnetic tape devices, as a larger amount of information is expected to be processed at once. In response to such a demand, various methods and techniques have been suggested to further improve the recording/reproducing circuits and the magnetic recording media employed in the magnetic storage devices.

In a magnetic storage device such as a hard disk device, a write driver circuit of a head amplifier IC in a read/write circuit applies a high-speed alternating current to a recording head to induce a recording magnetic field. By doing so, the recording head magnetizes a rotating magnetic disk, and records data on the magnetic disk.

FIG. 1 illustrates the structure of a conventional write driver circuit. As shown in FIG. 1, a write driver circuit 100 forms an "H-bridge" circuit including four transistors Q101 through Q104 and a magnetic head 101. In this structure, two transistors diagonally facing each other are switched on to apply current to the magnetic head 101. For instance, the transistors Q101 and Q104 are switched on while the transistors Q102 and Q103 are switched off, so that recording current flows into the magnetic head 101 from a connection point N toward another connection point P. With the recording current, the magnetic head 101 induces an alternating recording magnetic field, and magnetizes a magnetic recording medium (not shown) provided in the vicinity of the magnetic head 101. By doing so, the magnetic head 101 records information on the magnetic recording medium.

However, as the transfer rate increases, it becomes more essential to achieve accurate impedance matching. Therefore, write driver circuits with improved impedance matching processes have been developed in recent years.

FIG. 2 illustrates the structure of one of those write driver circuits. As shown in FIG. 2, a write driver circuit 110 includes a "double H-bridge" circuit including four outer transistors Q111 through Q114, four inner current sources Q111 through CS114, a magnetic head 101, and resistors R101 and R102 that are connected to either end of the magnetic head 101 and perform impedance matching.

The four outer transistors Q111 through Q114 operate in the same manner as the "H-bridge" circuit shown in FIG. 1. More specifically, as shown in FIGS. 3A and 3B, when a recording data signal is inputted to the bases of the transistors Q111 through Q114, the transistors Q111 and Q114 are switched on, and the transistors Q112 and Q113 are switched off. The recording current starts flowing from a connection point P toward another connection point N shown in FIG. 2. When the transistors Q111 and Q114 are switched off and the transistors Q112 and Q113 are switched on, the recording current flows from the connection point N to the connection point P. As a result, recording current having such a waveform as shown in FIG. 3E flows into the magnetic head 101. What is remarkable here is that the waveform of a rise of the recording current is not rectangular but is of the shape of a logarithmic function. This is due to the parasitic inductance in the transmission paths from the transistors to the magnetic head 101 and the inductance of the coil of the magnetic head 101. Here, the waveform is expressed as $\tau = L/R$, with the total sum of the parasitic inductance in the transmission paths and the inductance of the coil of the magnetic head 101 being L, the resistance value of the resistors R101 and R102 being R, and the rise time constant being $\tau$.

The recording current having the above waveform may degrade the overwrite characteristics and the NLTS (Non-Linear Transition Shift) characteristics in recording and reproduction operations. To avoid the degradation, the four current sources CS111 through CS114 apply pulse-type current to the magnetic head 101, so that the magnetism of the magnetic recording medium can be adequately reversed at the rise of the recording current. For example, when transistors Q111 and Q114 shown in FIG. 3A are switched on, the current sources CS111 and CS114 are also switched on for a short period of time, as shown in FIG. 3C. By doing so, pulse-type current flows into the magnetic head 101. Likewise, when the transistors Q112 and Q113 shown in FIG. 3B are switched on, the current sources CS112 and CS113 are switched on for a short period of time, as shown in FIG. 3D. By doing so, recording current having a waveform with an overshooting rise flows into the magnetic head 101, and the media characteristics such as the overwrite characteristics can be improved. However, in this structure, the four current sources CS111 and CS114 are necessary as well as the four transistors Q111 and Q114. As a result, the circuit size becomes larger, and so does the chip size of the head amplifier IC. With the increases in size, a larger amount of heat is generated. Because of this, the head amplifier IC cannot be placed in the vicinity of the magnetic head 101.

As shown in FIG. 2, the write driver circuit 110 also includes the resistors R101 and R102 to match the output impedance of the emitter followers of the transistors Q111 and Q113 with the impedance of the magnetic head 101. For instance, when the transistors Q111 and Q114 are on, the recording current flows from the transistor Q111 to a corrector of the transistor Q114 via the resistor R101, the magnetic head 101, and the resistor R102. However, the input impedance of the corrector of the transistor Q114 is too high, and a reflection wave is generated due to unmatched impedances. As a result, the waveform of the recording current is deformed. To avoid such an undesirable situation, the transistor Q113 is switched on, and current that is 10% or less than the recording current is applied. With the small amount of current flowing into a current source CS115, the input impedance of the corrector of the transistor Q114 is lowered, so that the impedance matching can be performed with the resistors R101 and R102, and a reflection wave can be prevented. In this case, however, there is an increase in power consumption, compared with a case in which the transistor Q113 is not switched on.

SUMMARY OF THE INVENTION

A general object of the present invention is to provide magnetic storage devices in which the above disadvantages are eliminated.

A more specific object of the present invention is to provide a magnetic storage device equipped with a write driver circuit that can perform impedance matching by a simple circuit, realize a smaller circuit size, reduce the power consumption, and perform recording at a higher transfer rate.

The above objects of the present invention are achieved by a magnetic storage device that records information on a recording medium by applying recording current to a magnetic head provided at the bridging part of an "H-bridge" circuit formed between a first power source and a second power source. This magnetic storage device includes: four current sources each provided at a corresponding one of the four sides of the "H-bridge" circuit, the four current sources outputting current flowing from the first power source toward the second power source, the four current sources forming two pairs of current sources, one of the pairs of current sources being switched on when the other pair of current sources is switched off, and being switched off when the other pair is switched on, so that the recording current flows into the bridging part only in one direction; and a series circuit including capacitors and resistors each provided between the ground or one of the first and second power sources and one of the connection points of the bridging part and the sides of the "H-bridge" circuit.

As described above, in accordance with the present invention, a current source is provided at each side of an "H-bridge"-circuit, and a magnetic head is provided at the bridging part of the "H-bridge" circuit. A capacitor and a resistor that are serially connected are provided between the ground or the power source and each connection point of the bridging part and the sides of the "H-bridge" circuit. With the capacitors and resistors, the impedance of the magnetic head can be matched with the impedance of the transmission paths from the current sources to the magnetic head. Accordingly, the waveform of the recording current at a high transfer rate cannot be deformed by unmatched impedances. Also, being formed with the four current sources, the capacitors, and the resistors, the magnetic storage device of the present invention has a smaller number of active elements than a conventional magnetic storage device. Accordingly, the circuit size is smaller, and the power consumption can be reduced.

Further, in the magnetic storage device of the present invention, a LCR series resonant circuit is formed with the capacitors, the resistors, the transmission paths connecting the magnetic head to the current sources, and the inductor of the magnetic head. With this resonant circuit, overshooting can be formed at the rise of the recording current, and the overshooting amount and the overshooting time width can be suitably adjusted. As a result, recording at a higher transfer rate can be performed, and the overwrite characteristics and the NLTS characteristics of the magnetic recording medium can be improved.

The above objects of the present invention are also achieved by a magnetic storage device that records information on a recording medium by applying recording current to a magnetic head provided at the bridging part of an "H-bridge" circuit formed between a first power source and a second power source. This magnetic storage device includes: four switching elements each provided at a corresponding one of the four sides of the "H-bridge" circuit, the four switching elements forming two pairs of switching elements, one of the pairs of switching elements being switched on when the other pair of switching elements is switched off, and being switched off when the other pair is switched on, so that the recording current flows into the bridging part only in one direction; and a series circuit including capacitors and resistors each provided between the ground or each corresponding one of the first and second power sources and each corresponding one of the connection points of the bridging part and the sides of the "H-bridge" circuit.

With this magnetic storage device, the impedance of the transmission paths connecting the switching elements to the magnetic head can be matched with the impedance of the magnetic head. Accordingly, the waveform of the recording current at a high transfer rate cannot be deformed by unmatched impedances. Also, as the number of active elements is small, the circuit size is also small, and the power consumption can be reduced accordingly. Furthermore, overshooting can be formed at the rise of the recording current, and the overshooting amount and the overshooting time width can be suitably adjusted. As a result, excellent recording can be performed at a high transfer rate, and the overwrite characteristics and the NLTS characteristics of the magnetic recording medium can be improved.

The above and other objects and features of the present invention will become more apparent from the following description taken in conjunction with the accompanying drawings.

BRIEF DESCRIPTION OF THE DRAWINGS

FIG. 4 is a perspective view of a magnetic disk device in accordance with a first embodiment of the present invention;

DESCRIPTION OF THE PREFERRED EMBODIMENTS

Figure 1:
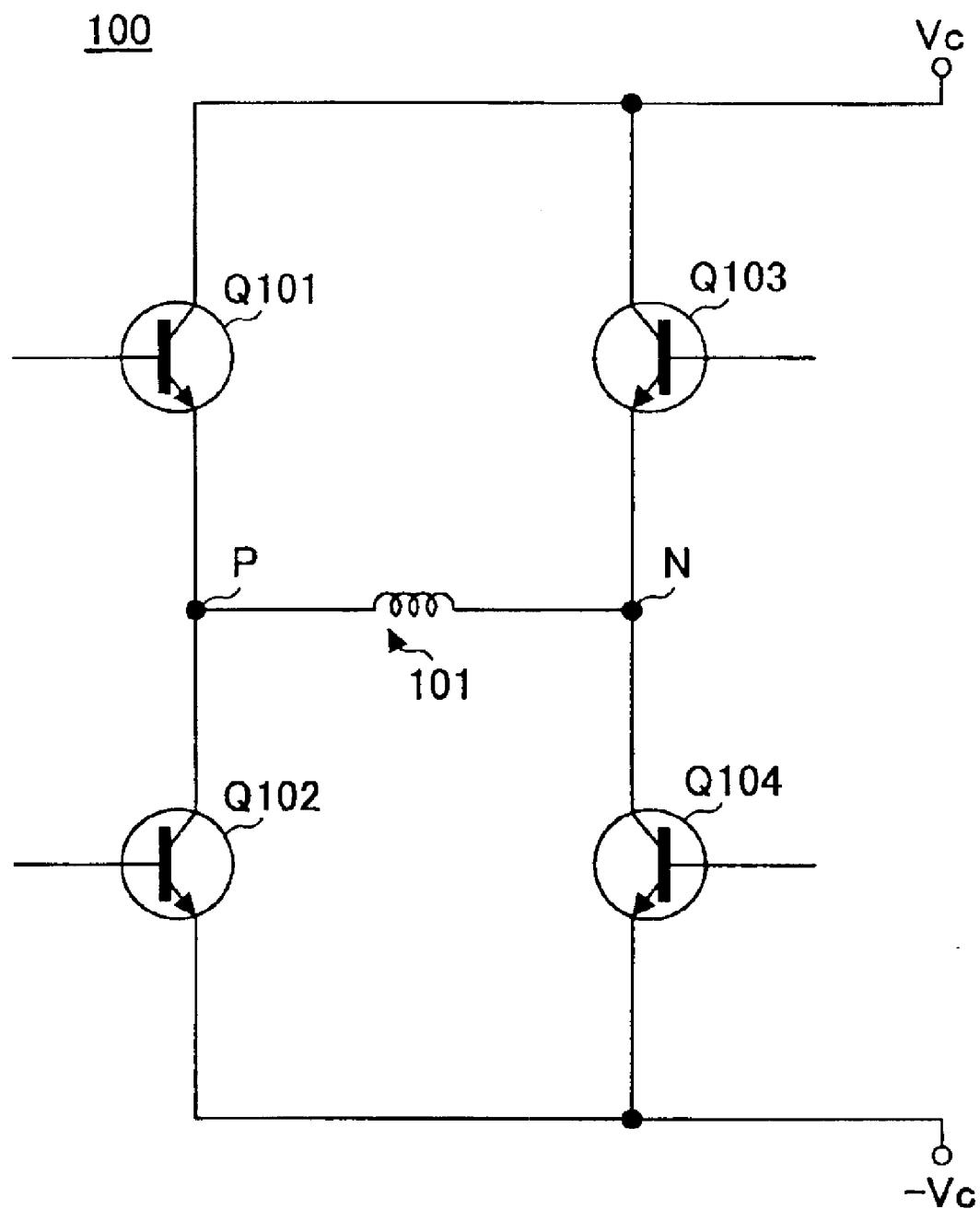
FIG. 1 illustrates the structure of a conventional write driver circuit.
Figure 2:
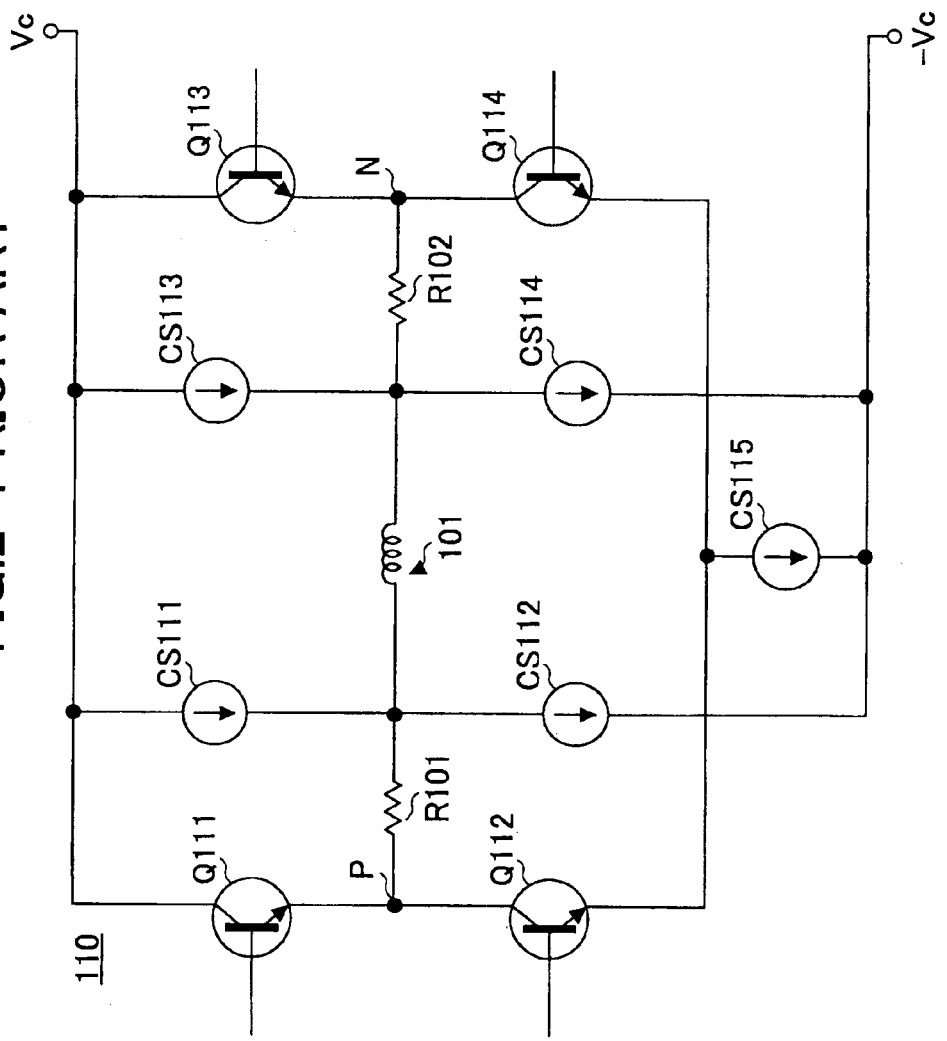
FIG. 2 illustrates the structure of another conventional write driver circuit.
Figure 3:
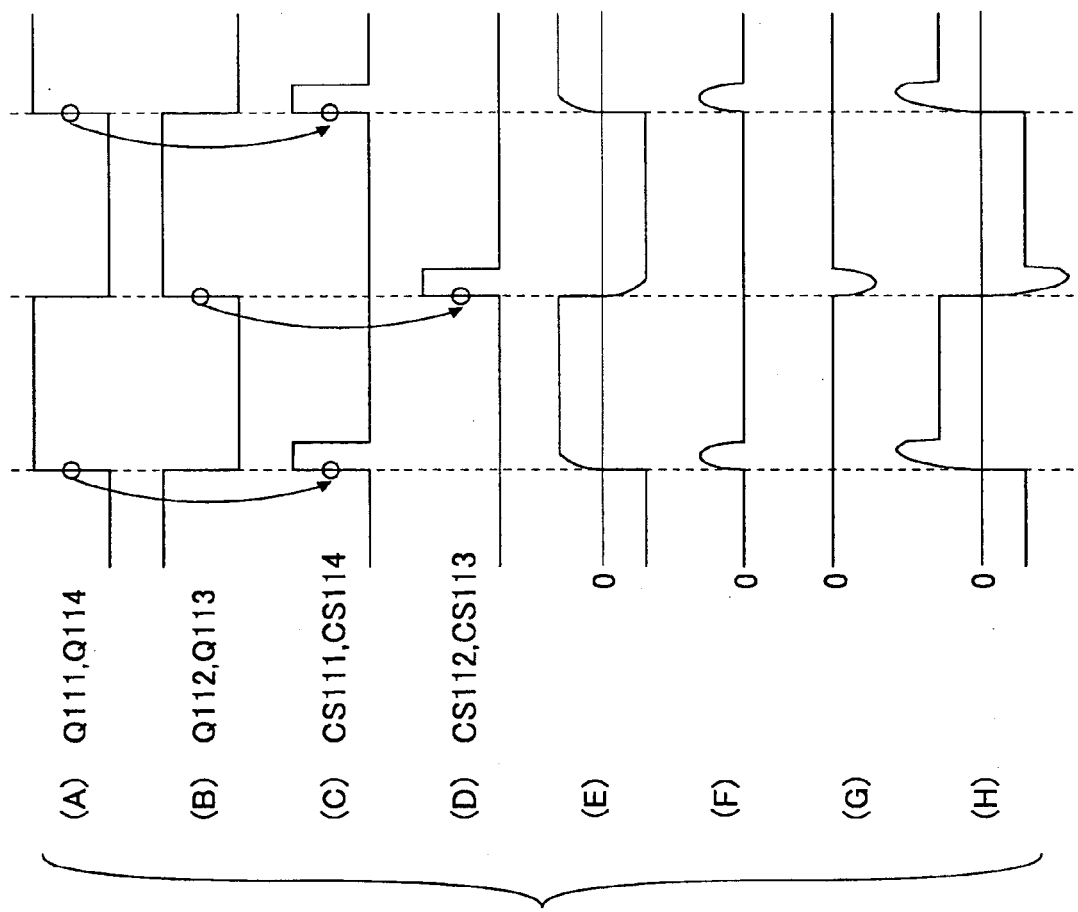
FIGS. 3A through 3H are waveform charts illustrating control signals and recording current.

The following is a description of embodiments of the present invention, with reference to the accompanying drawings.

First Embodiment

FIG. 4 is a perspective view of a magnetic disk device in accordance with a first embodiment of the present invention. As shown in FIG. 4, a magnetic disk device 10 is housed in housings 11A and 11B. This magnetic disk device 10 includes: a magnetic disk 13 secured by a spindle hub 12; a magnetic head 14 that is located in the vicinity of the magnetic disk 13 and performs recording and reproduction; a suspension 16 that supports the magnetic head 14 at one end and is secured by head arms 15 at the other hand; a head stack assembly 17 formed integrally with the head arms 15; a voice coil motor VCM 18 that drives the head stack assembly 17 so as to access a desired spot with the magnetic head 14; a circuit board 19 equipped with elements such as an IC to transmit instructions and data to, or receive instructions and data from, host computers so as to control the magnetic disk device 10; and a wiring board 21 that is secured to another component such as the head stack assembly 17 and is equipped with a head amplifier IC (or a HDIC) 20 that processes signals for recording and reproducing information through the magnetic head 14.

Receiving a recording data signal from a host computer, the magnetic disk device 10 slightly lifts up the magnetic disk 13 that is rotating in the direction of the arrow A shown in FIG. 4. The magnetic head 14 then performs a seeking operation in the direction of the arrow B shown in FIG. 4, so as to detect a desired spot on the magnetic disk 13. Based on the recording data signal, alternating recording current is generated from the HDIC 20, and recording is performed on the magnetic disk 13 by virtue of a recording magnetic field emanating from the magnetic head 14. As shown in FIG. 4, the magnetic head 14 and the HDIC 20 are connected to each other with a flexible printed circuit board (FPC) 22, and the HDIC 20 is located in the vicinity of the magnetic head 14 and may also be provided on the suspension 16. To reproduce recorded information, the magnetic field emanating from the magnetized magnetic disk 13 is converted into current or voltage by the magneto-sensitive element (not shown) of the magnetic head 14. The current or voltage is demodulated to generate a reproduction data signal by the HDIC 20, and the reproduction data signal is transmitted to the host computer.

Figure 5:
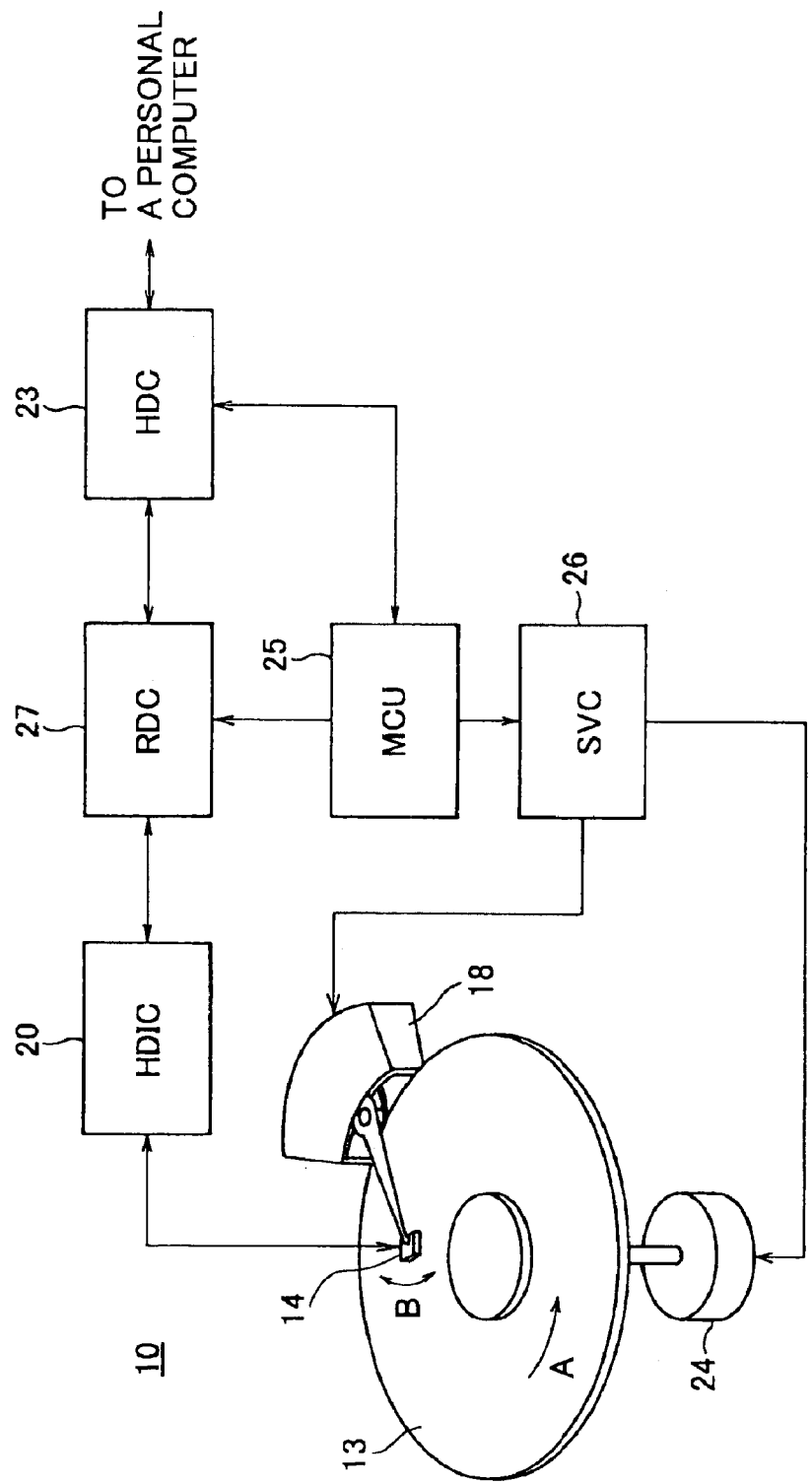
FIG. 5 is a block diagram of the magnetic disk device in accordance with the first embodiment.

FIG. 5 is a block diagram of the magnetic disk device in accordance with this embodiment.

Referring to FIG. 5, the magnetic disk device 10 includes: a HDC 23 that determines where to record each recording data signal transmitted from a personal computer onto the cylinders and sectors of the magnetic disk 13; a motor control unit (MCU) 25 and a servo controller (SVC) 26 that rotate a spindle motor 24 based on recorded information so as to adjust the position of the head; a read/write channel (RDC) 27 that modulates and demodulates each recording data signal; and the HDIC 20 that converts each modulated recording data signal into recording current to generate a reproduction data signal.

The HDC 23 adds an ECC (Error Correction Code) to each recording data signal received from a personal computer. The RDC 27 then modulates the recording data signal with the ECC, and performs recording compensation. The HDIC 20 converts the modulated recording data signal into alternating recording current by a built-in write driver circuit, and transmits the converted recording data signal to the magnetic head 14.

Figure 6:
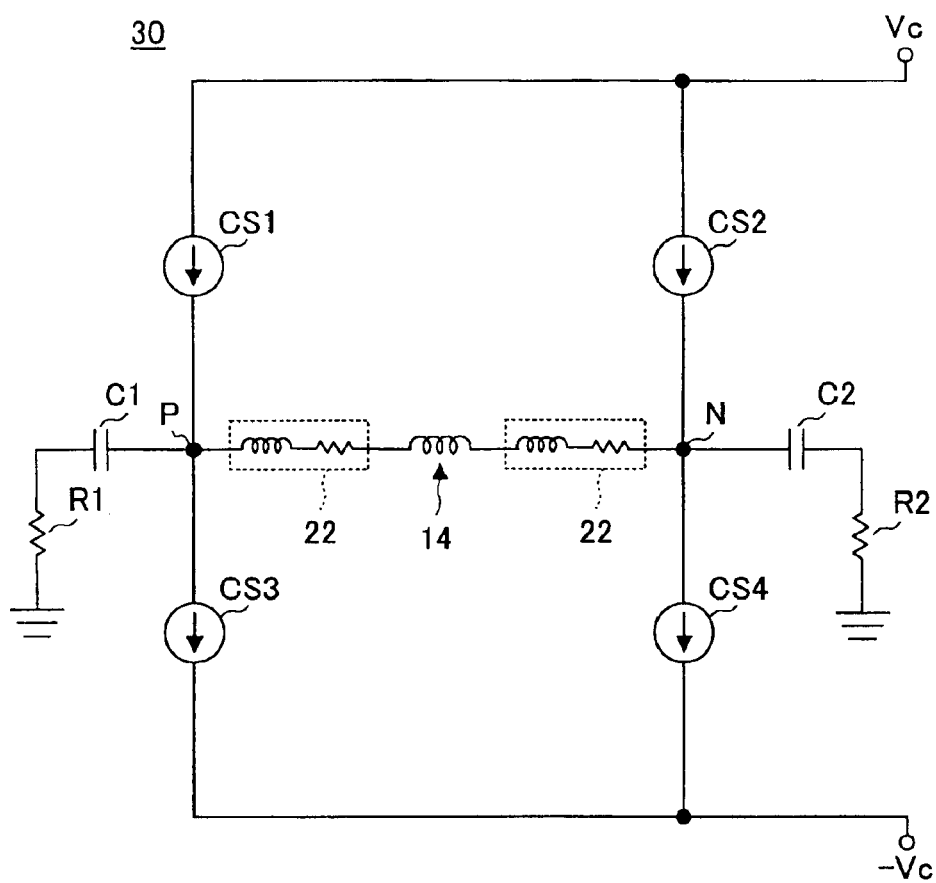
FIG. 6 illustrates the structure of a write driver circuit in accordance with the first embodiment of the present invention.

FIG. 6 illustrates the structure of a write driver circuit in accordance with this embodiment.

Referring to FIG. 6, a write driver circuit 30 includes four current sources CS1 through CS4 that are arranged at the four corners of an "H-bridge" circuit, a magnetic head 14 that is placed at the bridging part of the "H-bridge" circuit, a capacitor C1 and a terminating resistor R1 that are serially connected to each other and are located between a connection point P and the ground, and a capacitor C2 and a terminating resistor R2 that are serially connected to each other and are located between a connection point N and the ground. The current sources CS1 and CS2 are connected to a power source Vc, while the current sources CS3 and CS4 are connected to a power source –Vc. At a high transfer rate, there is a problem with the parasitic inductance and resistance on transmission lines 28 (for instance, the FPC 22 shown in FIG. 4) connecting the current sources CS1 through CS4 to the device of the magnetic head 14. The transmission lines 28 are schematically shown by inductors and resistors in FIG. 6. Here, the "bringing part" of the "H-bridge" circuit is the horizontal line of the character "H", and a "side" of the "H-bridge" circuit is a part of the vertical lines each divided in half by the "bridging part" of the character "H".

The current sources CS1 and CS3 are forward-connected in this order, and the current sources CS2 and CS4 are forward-connected in this order. The current sources CS1 through CS4 may be bipolar or CMOS transistors. The current sources CS1 and CS4 form a pair, while the current sources CS2 and CS3 form another pair. Based on a recording data signal "H" or "L", each pair is switched on and off. When one of the pairs is on, the other pair is off. Accordingly, the recording current flows into the magnetic head 14.

What is remarkable here is that the terminating resistors R1 and R2 and the capacitors C1 and C2 constitute a RC high pass filter. The terminating resistors R1 and R2 are set so that impedance matching can be maintained with the transmission lines 28. For instance, when the impedance of the transmission lines 28 is 50, the terminating resistors R1 and R2 are also set at 50 Ohm. Also, since frequency components lower than the cutoff frequency $f_\tau$ of the RC high pass filter cannot pass through, the cutoff frequency $f_\tau$ is set equal to or lower than the lowest recording frequency $f_{min}$ of each recording current signal. More specifically, the cutoff frequency $f_\tau$ is expressed as $f_\tau=(2\pi RC)^{-1}$, and the capacitors C1 and C2 are determined from the expression: $C \geq (2\pi R f_{min})^{-1}$. Here, R represents the resistance value of the terminating resistors R1 and R2, and C represents the electric capacity of the capacitors C1 and C2. The capacitors C1 and C2 are used to adjust the amount of overshooting in the recording current waveforms that will be described later.

In the following, the operation of the write driver circuit 30 will be described in detail, in conjunction with control signals for the current sources CS1 through CS4 and the recording current waveforms.

Figure 7:
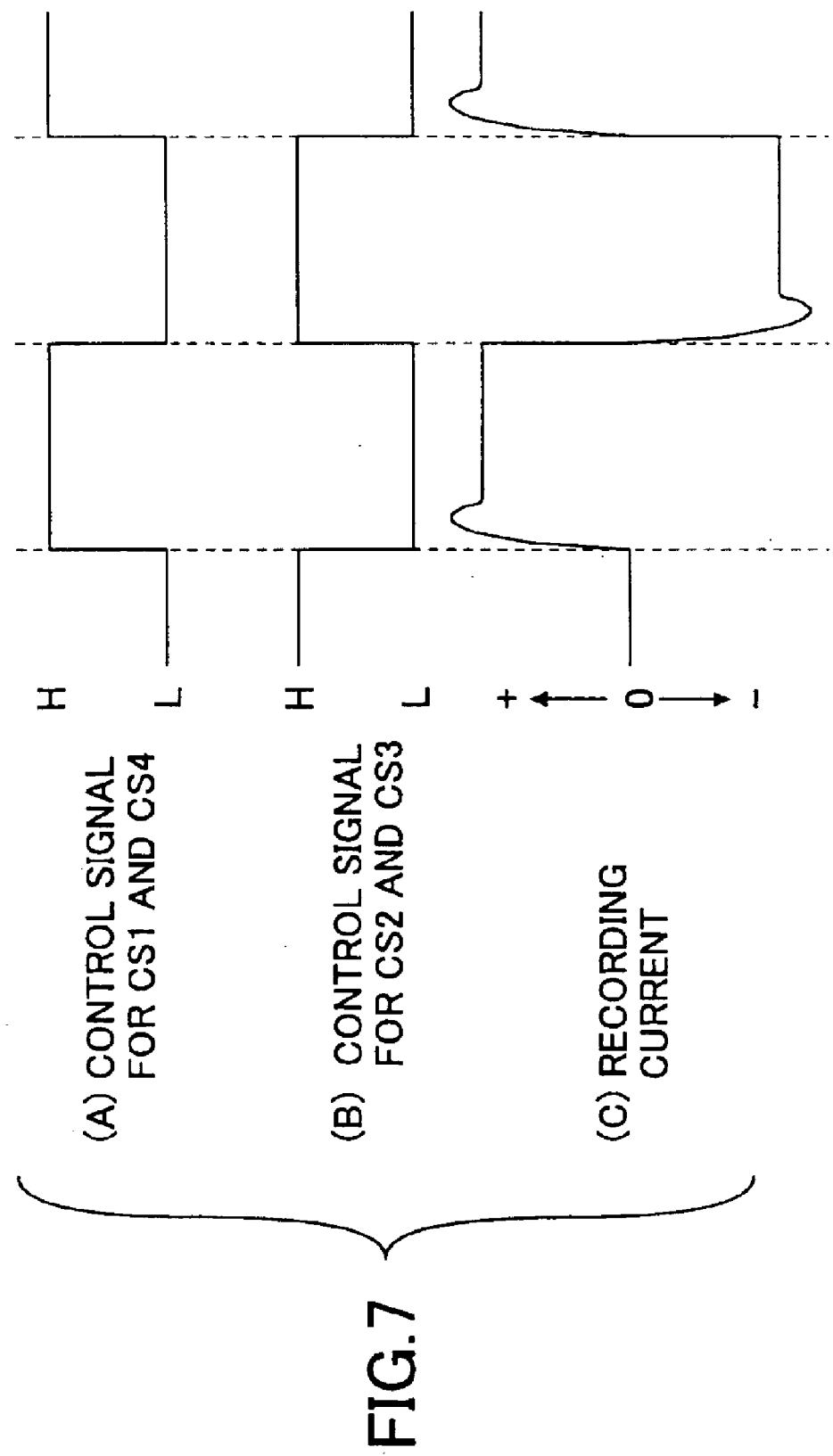
FIGS. 7A through 7C are waveform charts illustrating control signals for the current sources and recording current flowing into the magnetic head.

FIGS. 7A through 7C are waveform charts showing the control signals for the current sources and the recording current flowing into the magnetic head 14. FIG. 7A shows the waveform of a recording data signal to be inputted to the current sources CS1 and CS4. When the recording data signal is "H", the current sources CS1 and CS4 are switched on. Meanwhile, the control signal for the current sources CS2 and CS3 becomes "L", and accordingly, the current sources CS2 and CS3 are switched off, as shown in FIG. 7B. As a result, the recording current flows into the magnetic head 14 from the connection point P toward the connection point N shown in FIG. 6. When the control signals are in the opposite situation from the above, the recording signal flows from the connection point N toward the connection point P. The waveform shown in FIG. 7C represents the recording current of this situation. As shown in FIG. 7C, overshooting of the recording current waveform occurs at the time of a rise. This overshooting is due to the resonance of a LCR resonance circuit formed by the resistance value R of the terminating resistors R1 and R2, the electric capacity C of the capacitors C1 and C2, and the inductance L of the magnetic head 14 and the transmission lines 28 connecting the HDIC 20 to the magnetic head 14. The time width of this overshooting is determined by the above factors R, C, and L, and can be adjusted by varying the electric capacity C of the capacitors C21 and C2.

Figure 8:
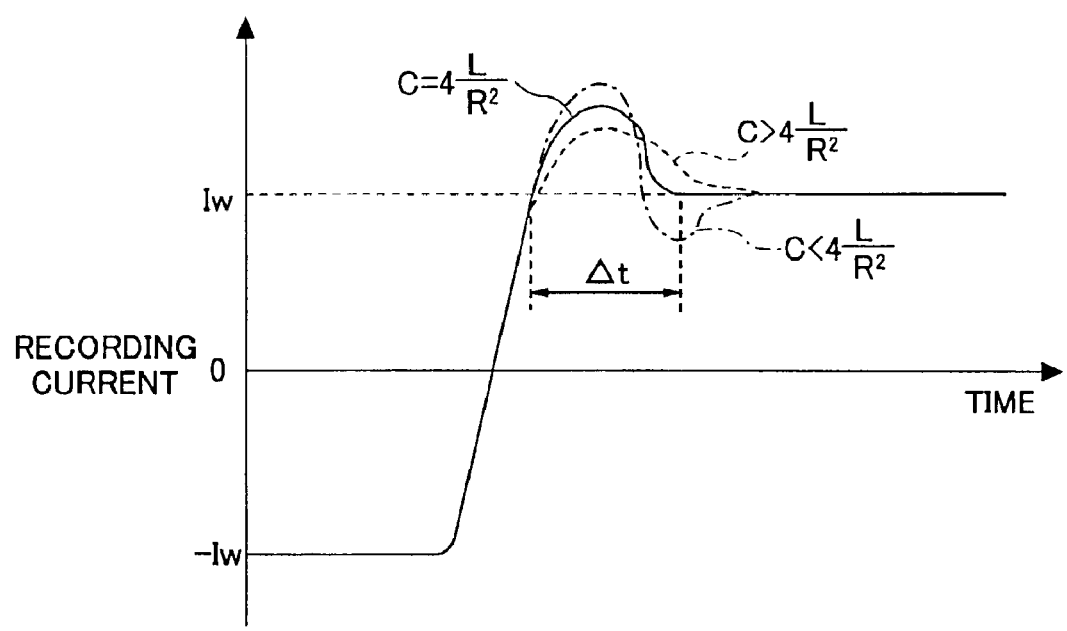
FIG. 8 illustrates the waveforms of rises in the recording current flowing into the magnetic head.

FIG. 8 illustrates the waveforms of rises in the recording current. As shown in FIG. 8, the overshooting time width Δt of a rise in the waveform of the recording current can be minimized by setting such as an electric capacity C to satisfy the equation: $C=4L/R^2$. The time width Δt cannot be minimized if the electric capacity C is larger or smaller than $4L/R^2$. This condition can be determined using a lumped parameter for the LCR resonant circuit.

Originally, overshooting of the recording current is aimed at applying a greater recording magnetic field to the magnetic disk when the recording magnetic field generated from the magnetic head is switched. Here, the greater recording magnetic field is greater than the recording magnetic field after the switching of the recording magnetic field. Accordingly, a magnetic field that is great enough to reverse the magnetism of the magnetic disk at a high speed can be maintained. With the write driver circuit 30 of this embodiment, the overwrite characteristics and the NLTS characteristics of the magnetic disk can be improved.

Meanwhile, the overshooting time width Δt should be long enough to reverse the magnetism of the magnetic disk, and can be estimated at $10^{-15}$ sec or shorter. If the overshooting time width Δt is too long, a magnetic field greater than the proper recording magnetic field (corresponding to the recording current Iw in FIG. 8) after the switching of the recording magnetic field is induced. As a result, the asymmetric characteristics of the magnetic disk might deteriorate. Therefore, the shorter the overshooting time width Δt, the better.

The capacitance C of the capacitors C1 and C2 is 48 pF, with the terminating resistor R1 being 50, and the inductance L of the magnetic head 14 and the transmission lines 28 connecting the HDIC 20 to the magnetic head 14 being 30 nH. As shown in FIG. 8, the overshooting time width Δt is a time between the time when the recording current surpasses the current level Iw and the time when the recording current returns to the level Iw and stabilizes there.

Figure 9:
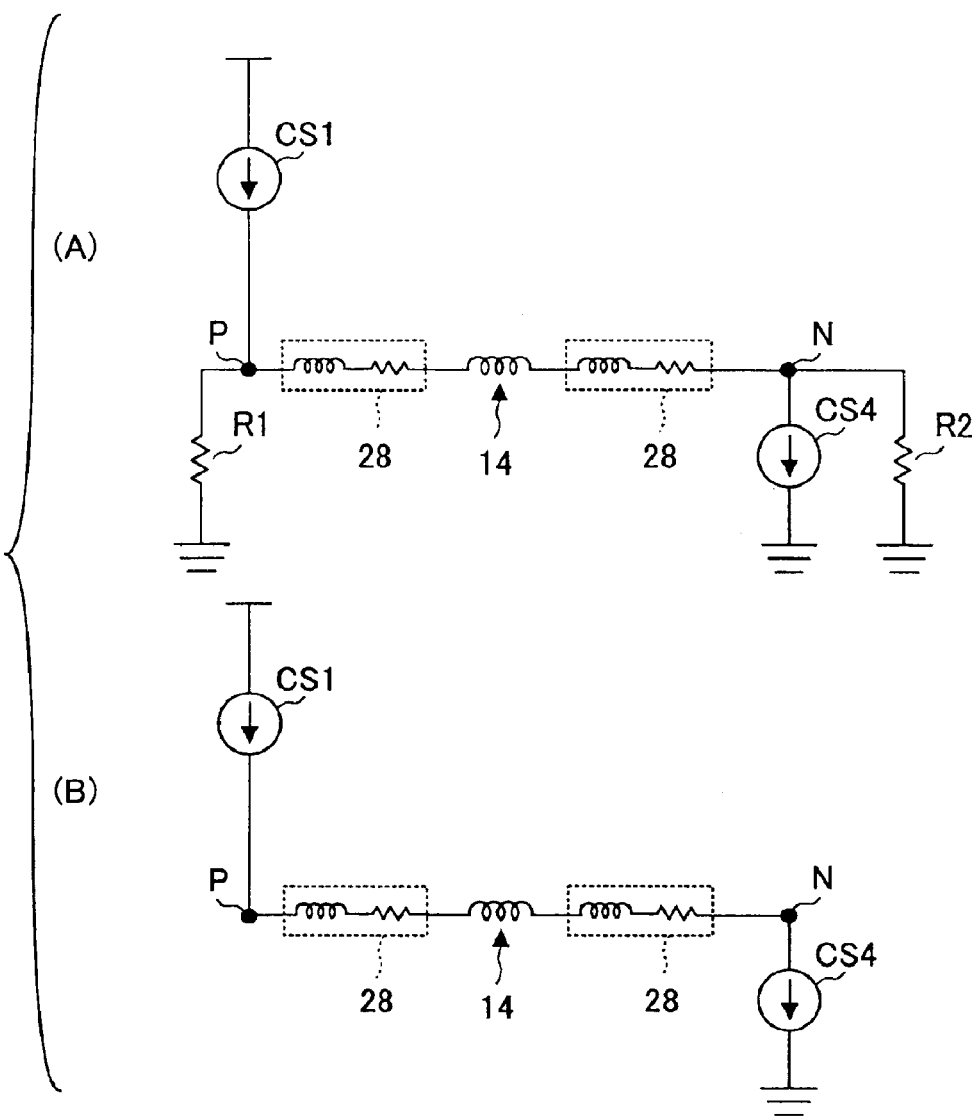
FIGS. 9A and 9B schematically illustrate equivalent circuits of the write driver circuit of the first embodiment.

FIGS. 9A and 9B show equivalent circuits to illustrate the operation of the write driver circuit of this embodiment. FIG. 9A illustrates the operation when the recording current is varied (switched), and FIG. 9B illustrates the operation when the recording current is stable.

When the recording current is switched, the recording current is made of high-frequency components, and the capacitors C1 and C2 short-circuit with the high-frequency components. Accordingly, the capacitors C1 and C2 are shown simply as lines in FIG. 9A. The recording current output from the current source CS1 flows into the magnetic head 14 from the connection point P toward the connection point N, and reaches the current source CS4 and the terminating resistor R2. This also applies to a case where the current sources CS2 and CS3 are on.

When the recording current is stable, as shown in FIG. 9B, the capacitors C1 and C2 serve as insulators. Accordingly, the recording current output from the current source CS1 flows into the magnetic head 14 from the connection point P toward the connection point N, and reaches the current source CS4.

As described above, impedance matching can be performed by the series circuit of the terminating resistors R1 and R2 and the capacitors C1 and C2, a separate series circuit connected to each end of the magnetic head 14 and the ground or the power source. As the write driver circuit 30 is formed with the four current sources CS1 through CS4, the capacitors C1 and C2, and the terminating resistors R1 and R2, the number of active elements can be reduced. Also, the HDIC 20 to which the write driver circuit 30 is to be mounted can be made smaller, and power consumption can be reduced accordingly. In this embodiment, while one pair of current sources is on, the other pair of current sources is off. Accordingly, power consumption can be further reduced. Also, the LCR resonant circuit can cause overshooting in the waveform of the recording current, and the capacitors C1 and C2 can adjust the overshooting time width Δt. Thus, it is possible to cope with a higher transfer rate.

Although the terminating resistors R1 and R2 are connected to the ground in the above series circuits of the capacitors C1 and C2 and the terminating resistors R1 and R2, respectively, serially connected to one another, the capacitors C1 and C2, instead of the terminating resistors R1 and R2, may be connected to the ground. The serially connected capacitors C1 and C2 and the terminating resistors R1 and R2 may be connected to the power source, instead of the ground.

Figure 10:
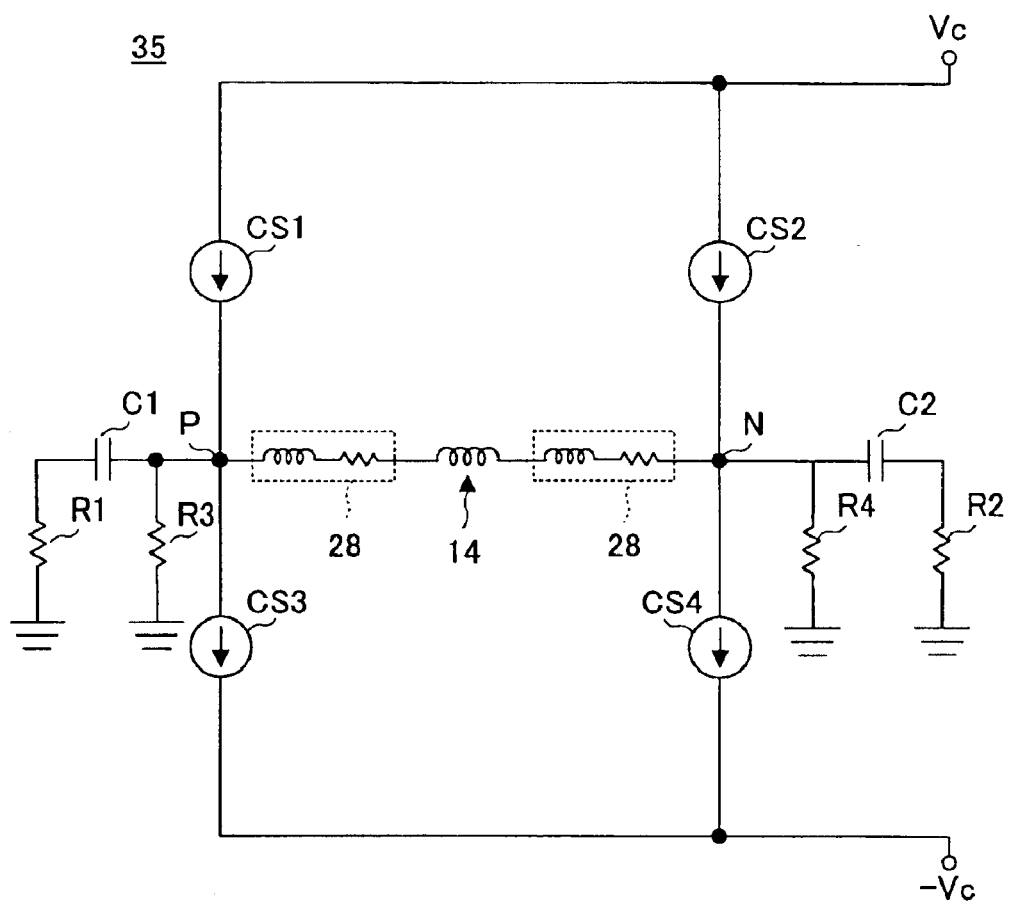
FIG. 10 illustrates a write driver circuit that is a first modification of the write driver circuit in accordance with the first embodiment of the present invention.

FIG. 10 illustrates a write driver circuit that is a first modification of the write driver circuit in accordance with the first embodiment. In FIG. 10, the same components as those of the first embodiment are denoted by the same reference numerals as the corresponding reference numerals in the foregoing drawings, and therefore, explanation of those components will be omitted in the following description.

Referring to FIG. 10, a write driver circuit 35 of this modification has the same structure as the write driver circuit 30 of the first embodiment, except that a resistor R3 is provided between the connection point P and the ground, and a resistor R4 is provided between the connection point N and the ground. The resistors R3 and R4 are substantially set at the center value of the power source voltages of the connection points P and N. The resistance value of the resistors R3 and R4 should be 1 k or greater, and more preferably, 1 k to 10 k for a more stable potential.

With this embodiment, the potential of the magnetic head 14 can be set at the center value. Thus, the operation of elements such as transistors employed as the current sources can be stabilized.

Second Embodiment

Figure 11:
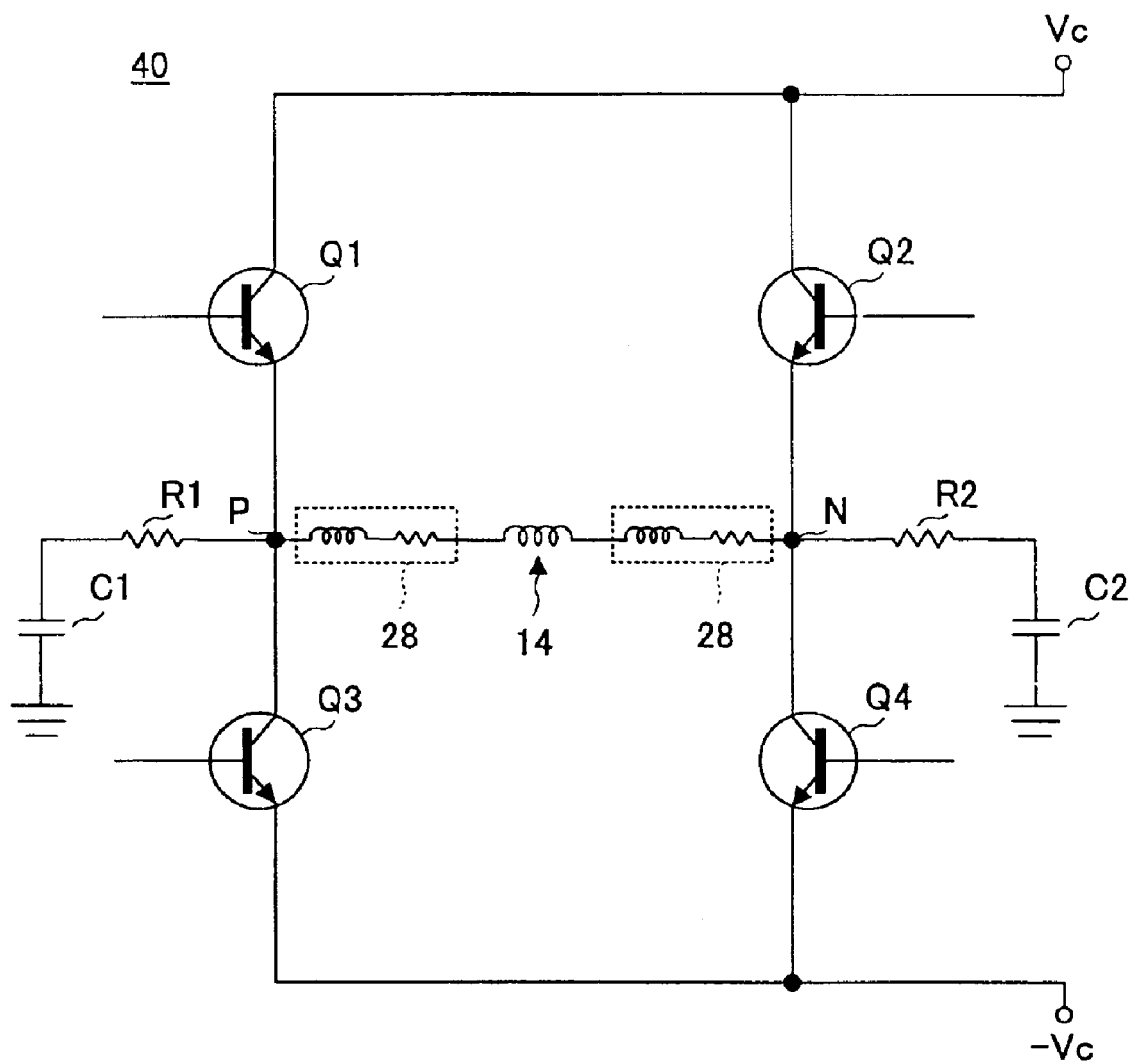
FIG. 11 illustrates a write driver circuit in accordance with a second embodiment of the present invention.

FIG. 11 illustrates a write driver circuit in accordance with a second embodiment of the present invention. In FIG. 11, the same components as the components in the first embodiment are denoted by the same reference numerals as the corresponding reference numerals in the foregoing drawings, and therefore, explanation of those components will be omitted in the following description.

Referring to FIG. 11, a write driver circuit 40 of this embodiment includes four transistors Q1 through Q4 arranged at the four corners of an "H-bridge" circuit, a magnetic head 14 that is located at the bridging part of the "H bridge", and a series circuit of capacitors C1 and C2 and terminating resistors R1 and R2 provided between the ground and each connection point of a side of the "H bridge" and either end of the magnetic head 14. The transmission line 28 between the element of the magnetic head 14 and each corresponding one of the transistors Q1 through Q4 is schematically shown as an inductor and a resistor in FIG. 11.

The transistors Q1 and Q3 are forward-connected in this order, and the transistors Q2 and Q4 are forward-connected in this order. The transistors Q1 through Q4 may be, for example, NPN bipolar transistors, PNP bipolar transistors, n-channel MOS transistors, or p-channel MOS transistors. The transistors Q1 and Q4 form a pair, while the transistors Q2 and Q3 form another pair. With a recording data signal "H" or "L", the transistors Q1 through Q4 are switched on and off. When one of the pairs is on, the other pair is off. In this manner, recording current flows into the magnetic head 14. The recording current waveform of the write driver circuit 40 is the same as the recording current waveform of the write driver circuit of the first embodiment shown in FIGS. 7C and 8.

In accordance with this embodiment, impedance matching can be performed by the series circuit of the capacitors C1 and C2 and the terminating resistors R1 and R2 connected to either end of the magnetic head 14 and the ground or a power source terminal. As the write driver circuit 40 is formed with the four transistors Q1 through Q4, the capacitors C1 and C2, and the terminating resistors R1 and R2, the number of active elements can be reduced. Also, the HDIC 20 to which the write driver circuit 40 is to be mounted can be made smaller, and the power consumption can be reduced. In this embodiment, while one pair of transistors is on, the other pair of transistors is off. Accordingly, power consumption can be further reduced. Also, the LCR resonant circuit can cause overshooting in the waveform of the recording current, and the capacitors C1 and C2 can adjust the overshooting time width Δt. Thus, it is possible to cope with a higher transfer rate.

Figure 12:
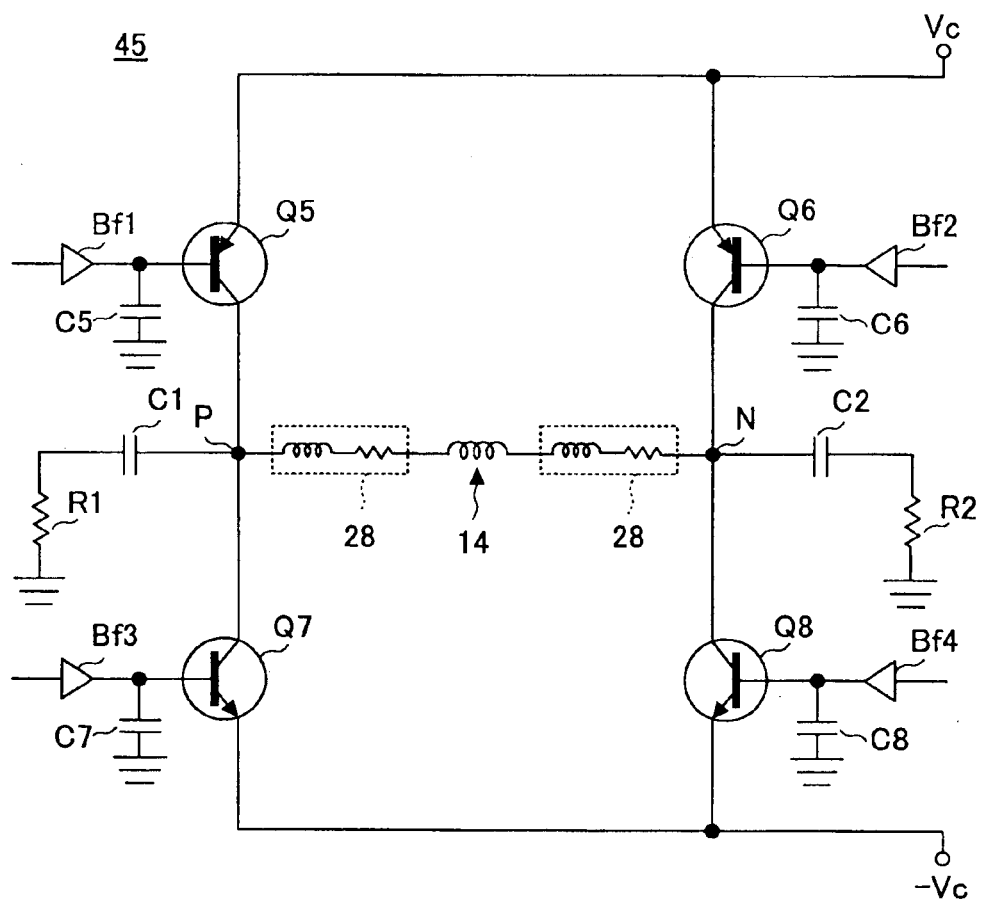
FIG. 12 illustrates a write driver circuit that is a second modification of the write driver circuit in accordance with the first embodiment.

FIG. 12 illustrates a write driver circuit that is a second modification of the write driver circuit in accordance with the first embodiment.

Referring to FIG. 12, a write driver circuit 45 of this modification includes PNP transistors Q5 and Q6, instead of the current sources CS1 and CS2 of the write driver circuit 30 of the first embodiment shown in FIG. 6, and NPN transistors Q7 and Q8, instead of the current sources CS3 and CS4. The bases of the transistors Q5 through Q8 are connected to the output ends of buffers Bf1 through Bf4, respectively. Further, the bases of the transistors Q5 through Q8 are connected to capacitors C5 through C8, respectively, that are also connected to the ground. The capacitors C5 through C8 serve as low pass filters, when recording data signals outputted from the buffer Bf1 through Bf4 are inputted to the bases of the transistors Q5 through Q8. Thus, the waveform of the recording current flowing into the magnetic head 14 can be adjusted.

FIGS. 13A through 13D are waveform charts illustrating signals to be inputted to the bases of the transistors Q5 through Q8 and the recording current flowing into the magnetic head 14. In FIGS. 13A through 13D, the waveforms indicated by broken lines illustrate cases where the capacitors C5 through C8 are not employed, and the waveforms indicated by solid lines illustrate the actual waveforms in this modification.

Figure 13:
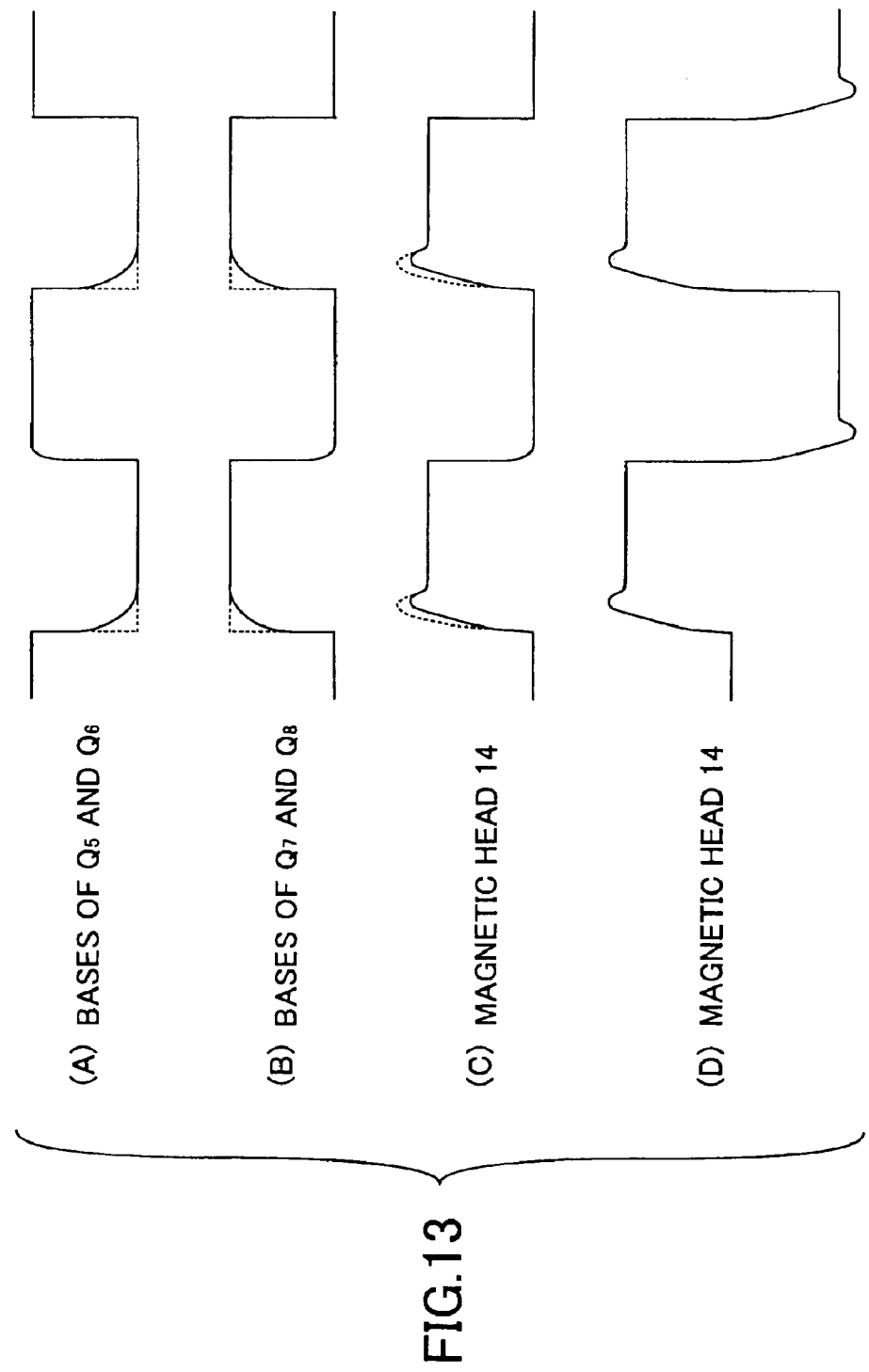
FIGS. 13A through 13D are waveform charts illustrating signals to be inputted to the bases of the transistors shown in FIG. 12 and the recording current flowing into the magnetic head shown in FIG. 12.

In FIGS. 13A and 13B, the waveforms of signals to be inputted to the bases of the transistors Q5 through Q8 each has a longer rise time, compared with the waveforms indicated by the broken lines. This is because there is current flowing into the capacitors C5 through C8. In accordance with the recording data signals, the waveform shown in FIG. 13C showing the recording current that flows into the magnetic head 14 only when the transistors Q5 and Q8 are on, has a longer rise time and a smaller overshooting amount, compared with the waveform (indicated by the broken line) of the case where the capacitors C5 through C8 are not employed. When the transistors Q5 and Q8 are off, the transistors Q6 and Q7 are on. Accordingly, in the write driver circuit 45 of this modification, the recording current shown in FIG. 13D flows into the magnetic head 14.

In the above manner, the rise time and the overshooting amount of the recording current waveform can be adjusted with precision by the capacitors C5 through C8 in this modification. As a result, a recording current waveform that is compatible with the characteristics and the recording conditions of the magnetic disk 14 can be realized.

Figure 14:
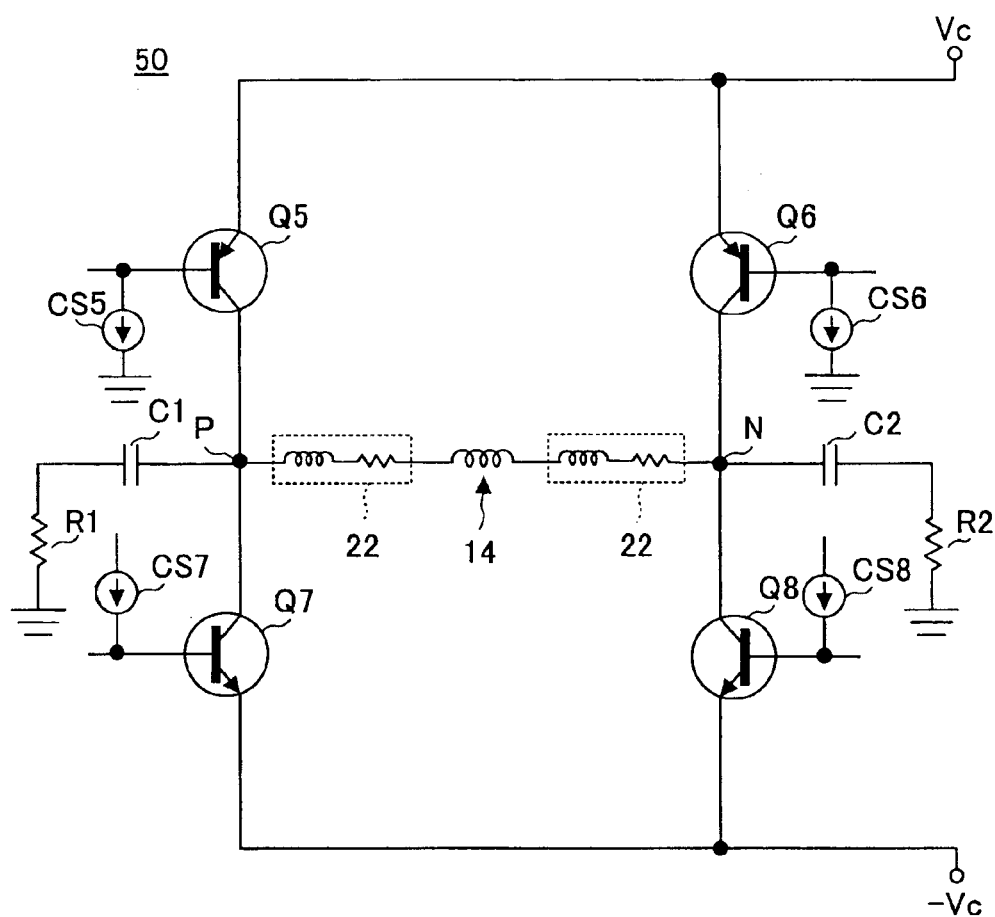
FIG. 14 illustrates a write driver circuit that is a third modification of the write driver circuit in accordance with the first embodiment.

FIG. 14 illustrates a write driver circuit that is a third modification of the write driver circuit in accordance with the first embodiment. FIGS. 15A through 15E are waveform charts illustrating signals to be inputted to the bases of transistors Q5 through Q8 of this modification and the recording current flowing into the magnetic head 14.

Figure 15:
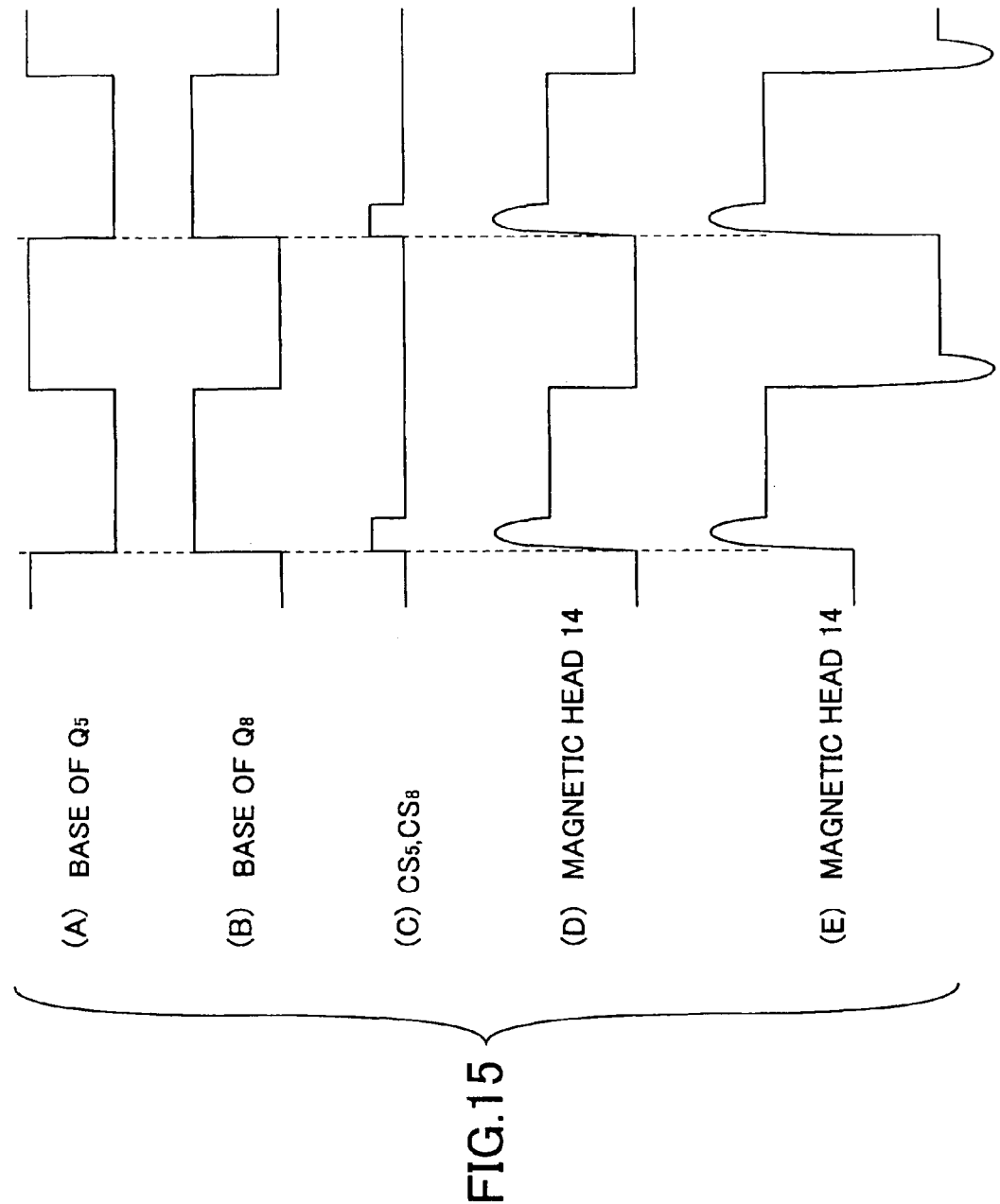
FIGS. 15A through 15E are waveform charts showing signals to be inputted to the bases of the transistors shown in FIG. 14 and the recording current flowing into the magnetic head shown in FIG. 14.

Referring to FIG. 14, a write driver circuit 50 of this modification includes PNP transistors Q5 and Q6, instead of the current sources CS1 and CS2 of the write driver circuit 30 of the first embodiment shown in FIG. 6, and NPN transistors Q7 and Q8, instead of the current sources CS3 and CS4 of the write driver circuit 30. The bases of the transistors Q5 and Q6 are connected to the input ends of current sources CS5 and CS6, respectively, and the bases of the transistors Q7 and Q8 are connected to the output ends of current sources CS7 and CS8, respectively. As shown in FIGS. 15A through 15C, the current sources CS5 and CS8 are switched on in synchronization with the reversals of the recording data signal to be inputted to the base of the transistor Q5. More specifically, the current sources CS5 and CS8 are switched on when the recording data signal drops from "H" to "L" or rises from "L" to "H". After being switched on, the current sources CS5 and CS8 output recording current having a rectangular waveform, and increase the amount of base current, as shown in FIG. 15D. Thus, the rise time and the overshooting amount of the recording current flowing into the magnetic head 14 can be adjusted. When the transistors Q5 and Q8 are off, the transistors Q6 and Q7 are on. Accordingly, the recording current shown in FIG. 15E can flow into the magnetic head 14 in the write driver circuit 50 of this modification.

In accordance with this modification, impedance matching can be performed by the series circuit of the capacitors C1 and C2 and the terminating resistors R1 and R2 connected to the connection points P and N at both ends of the magnetic head 14, even though the current sources CS5 through CS8 output current having a rectangular waveform. Thus, reflection (reflection waves) can be prevented, and the waveform of the recording current cannot be deformed. Also, a desired overshooting amount and a desired rise time can be set by suitably adjusting the amount of current outputted from the current sources CS5 through CS8.

The above modifications of the first embodiment can also be combined with the second embodiment.

Although a magnetic disk device is employed in the above embodiments, the magnetic storage device of the present invention is not limited to the magnetic disk device. The magnetic storage device of the present invention may be, for example, a magnetic tape device or any other device as long as it employs the principles of alternating the recording magnetic fields and performing recording on a magnetic recording medium.

It should be noted that the present invention is not limited to the embodiments specifically disclosed above, but other variations and modifications may be made without departing from the scope of the present invention.

What is claimed is:

1. A magnetic storage device that records information on a recording medium by applying recording current to a magnetic head provided at a bridging part of an "H-bridge" circuit formed between a first power source and a second power source, the magnetic storage device comprising:

a current source provided at each corresponding one of the four sides of the "H-bridge" circuit, the current sources outputting current flowing from the first power source toward the second power source, the current sources forming two pairs of current sources, one of the pairs of current sources being switched on when the other pair of current sources is switched off, and being switched off when the other pair is switched on, so that the recording current flows into the bridging part only in one direction at a time; and a series circuit including a capacitor and a resistor provided between the ground and a connection point of the bridging part and the four sides of the "H-bridge" circuit, each said connecting point being provided with a separate one of said series circuits.

2. The magnetic storage device as claimed in claim 1, further comprising a resistor provided between each said connection point and the ground.

3. A magnetic storage device that records information on a recording medium by applying recording current to a magnetic head provided at a bridging part of an "H-bridge" circuit formed between a first power source and a second power source, the magnetic storage device comprising:

a switching element provided at each one of the four sides of the "H-bridge" circuit, the switching elements forming two pairs of switching elements, one of the pairs of switching elements being switched on when the other pair of switching elements is switched off, and being switched off when the other pair is switched on, so that the recording current flows into the bridging part only in one direction at a time; and a series circuit including a capacitor and a resistor provided between the ground and a connection point of the bridging part and the four sides of the "H-bridge" circuit, each said connecting point being provided with a separate one of said series circuits.

4. The magnetic storage device as claimed in claim 3, wherein:

the switching elements are transistors; and a control signal used for performing the switching on and off control is supplied, via a low pass filter, to the transistors on the side of applying the recording current to the magnetic head.

5. The magnetic storage device as claimed in claim 3, wherein:

the switching elements are transistors; and a current source for applying current to the magnetic head during a rise time of the recording current is further provided at each said connection point.

6. The magnetic storage device as claimed in claim 1, wherein the electric capacity C of the capacitors is expressed as $C \geq (2\pi R f_{min})^{-1}$, where R represents the resistance value of the resistors of the series circuits, and $f_{min}$ represents the lowest frequency of the recording current.

7. The magnetic storage device as claimed in claim 3, wherein the electric capacity C of the capacitors is expressed as $C \geq (2\pi R f_{min})^{-1}$, where R represents the resistance value of the resistors of the series circuits, and $f_{min}$ represents the lowest frequency of the recording current.

* * * * *